United States Patent
Song (10) Patent No.: US 9,048,506 B2
(45) Date of Patent: Jun. 2, 2015

(54) SECONDARY BATTERY AND MANUFACTURING METHOD THEREOF

(75) Inventor: Hyo-Jung Song, Yongin-si (KR)

(73) Assignee: Samsung SDI Co., Ltd., Yongin-Si (KR)

( * ) Notice: Subject to any disclaimer, the term of this patent is extended or adjusted under 35 U.S.C. 154(b) by 687 days.

(21) Appl. No.: 12/969,416

(22) Filed: Dec. 15, 2010

(65) Prior Publication Data

US 2011/0151292 A1 Jun. 23, 2011

(30) Foreign Application Priority Data

Dec. 23, 2009 (KR) ......................... 10-2009-0129790

(51) Int. Cl.
*H01M 2/12* (2006.01)
*H01M 10/0565* (2010.01)
*H01M 2/02* (2006.01)
*H01M 2/10* (2006.01)

(52) U.S. Cl.
CPC ........ *H01M 10/0565* (2013.01); *H01M 2/1252* (2013.01); *H01M 2/12* (2013.01); *H01M 2/0275* (2013.01); *H01M 2/0277* (2013.01); *H01M 2/0285* (2013.01); *H01M 2/0287* (2013.01); *H01M 2/1061* (2013.01)

(58) Field of Classification Search
CPC .............................. H01M 2/12; H01M 2/1252
USPC ............... 429/53, 54, 56, 57, 82, 83, 89, 185; 29/623.1, 623.2, 623.5
See application file for complete search history.

(56) References Cited

U.S. PATENT DOCUMENTS

2007/0154803 A1* 7/2007 Kim et al. ..................... 429/185

FOREIGN PATENT DOCUMENTS

| KR | 1020020078084 | 10/2002 |
|---|---|---|
| KR | 1020030033210 | 5/2003 |
| KR | 1020030035185 | 5/2003 |
| KR | 1020030039703 | 5/2003 |
| KR | 10-586896 | 6/2006 |
| WO | WO 2009078604 A2 * | 6/2009 |

OTHER PUBLICATIONS

Office Action dated Oct. 28, 2011 for corresponding KR Application No. 10-2009-0129790.

* cited by examiner

*Primary Examiner* — Jonathan G Leong
*Assistant Examiner* — James Erwin
(74) *Attorney, Agent, or Firm* — Knobbe Martens Olson & Bear LLP (57) ABSTRACT

There are a secondary battery having a pouch-type outer casing and a manufacturing method thereof. In one embodiment, a secondary battery includes an electrode assembly and an outer casing. The electrode assembly has positive and negative electrode plates, a separator interposed therebetween, and positive and negative electrode tabs having one ends respectively connected to the positive and negative electrode plates. The outer casing accommodates the electrode assembly so that the other ends of the positive and negative electrode tabs are extracted from a first side to the exterior thereof. The outer casing has a sealing portion sealed at least twice. The sealing portion is primarily sealed to be fractured under a predetermined internal pressure of the outer casing. After the aging of a battery, the sealing portion is fractured under the predetermined internal pressure, thereby exhausting internal gas. After the exhaustion of the internal gas, the sealing portion is secondarily sealed.

24 Claims, 7 Drawing Sheets

SECONDARY BATTERY AND MANUFACTURING METHOD THEREOF

RELATED APPLICATIONS

This application claims priority to and the benefit of Korean Patent Application No. 10-2009-0129790, filed on Dec. 23, 2009, in the Korean Intellectual Property Office, the entire content of which is incorporated herein by reference.

BACKGROUND

1. Field

An aspect of the present invention relates to a secondary battery, and more particularly, to a thinner secondary battery capable of facilitating the exhaustion of internal gas, and a manufacturing method of the secondary battery.

2. Description of the Related Art

When a lithium polymer battery using a polymer electrolyte is charged or discharged, lithium ions are intercalated into a positive or negative electrode while moving between the positive and negative electrodes, thereby operating the lithium polymer battery. Since there is little change of the electrodes, caused by the operation of the battery, stable charge/discharge is possible. When the polymer electrolyte is a gel-type polymer electrolyte, it serves as an electrolyte while forming a separator between the positive and negative electrodes.

Such lithium polymer batteries have reduced leakage of a liquid electrolyte and reduced risk of explosion due to the leakage of the liquid electrolyte. Therefore, the lithium polymer battery is more easily manufactured not using a can type case but using a bag type outer casing such as a pouch.

SUMMARY

In one embodiment, there is provided a secondary battery capable of decreasing its thickness by facilitating the exhaustion of internal gas.

In another embodiment, there is provided a manufacturing method of a secondary battery capable of facilitating the exhaustion of internal gas generated from the secondary battery using a pouch type outer casing.

According to an aspect of the present invention, there is provided a secondary battery including an electrode assembly having a positive electrode plate, a negative electrode plate, a separator interposed therebetween, and positive and negative electrode tabs having one ends respectively connected to the positive and negative electrode plates; and an outer casing for accommodating the electrode assembly so that the other ends of the positive and negative electrode tabs are extracted from a first surface to the exterior thereof, the outer casing having a gas passage at a second surface, wherein the gas passage comprises: an inlet portion through which gas is inlet from the outer casing; a path portion through which the inlet gas is exhausted; a primary sealing portion formed by sealing a portion of the gas passage; and a secondary sealing portion formed by sealing the entire gas passage.

In one embodiment, the primary sealing portion is formed to be fractured under a predetermined internal pressure of the outer casing, and the secondary sealing portion is formed after the gas is exhausted from the fractured primary sealing portion.

The inlet and outlet portions may not be positioned on a straight line. The path portion may be formed to extend along the second surface of the outer casing between the inlet and outlet portions.

In one embodiment, the width of the second surface at which the gas passage is formed is wider than that of the third surface facing the folded surface.

According to another aspect of the present invention, there is provided a manufacturing method of a secondary battery, which includes removing a gas room from a bare cell, the bare cell having the gas room connected to an interior of the bare cell in which an electrode assembly is accommodated through a gas passage to collect gas generated in the interior of the bare cell; primarily sealing a portion of the gas passage in the bare cell having the gas room removed therefrom; aging the bare cell in which the portion of the gas passage is primarily sealed; and secondarily sealing the entire gas passage after the gas generated in the interior of the bare cell is exhausted by fracturing the primarily sealed gas passage under a predetermined internal pressure of the bare cell.

In the primarily sealing, only the portion of the gas passage may be sealed so that the gas passage is fractured under the predetermined internal pressure.

One and the other ends of the gas passage may be connected to each other through a path portion extended longer than a straight line path for connecting the one end and the other end to each other. The gas passage may have a path portion extended between the one and the other ends thereof.

In one embodiment, the primary sealing portion is positioned at a portion adjacent to the inside of the outer casing.

A portion of the second surface at which the gas passage is formed may be removed before or after the secondary sealing. The primary sealing portion may be positioned to face a direction opposite to the gravitational direction.

According to these embodiments, in a manufacturing process of a secondary battery, gas generated in a battery can be easily exhausted at least twice. Further, the thick of the battery can be decreased by the exhaustion of the internal gas. Furthermore, the thickness distribution of the battery is decreased after fully charging the battery, so that a fabrication error can be decreased in a subsequent process of attaching a protection circuit board or external case, and accordingly, the occurrence of failures can be reduced. That is, the yield of products can be increased.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. In the drawings, the thickness or size of layers are exaggerated for clarity and not necessarily drawn to scale.

Figure 1:
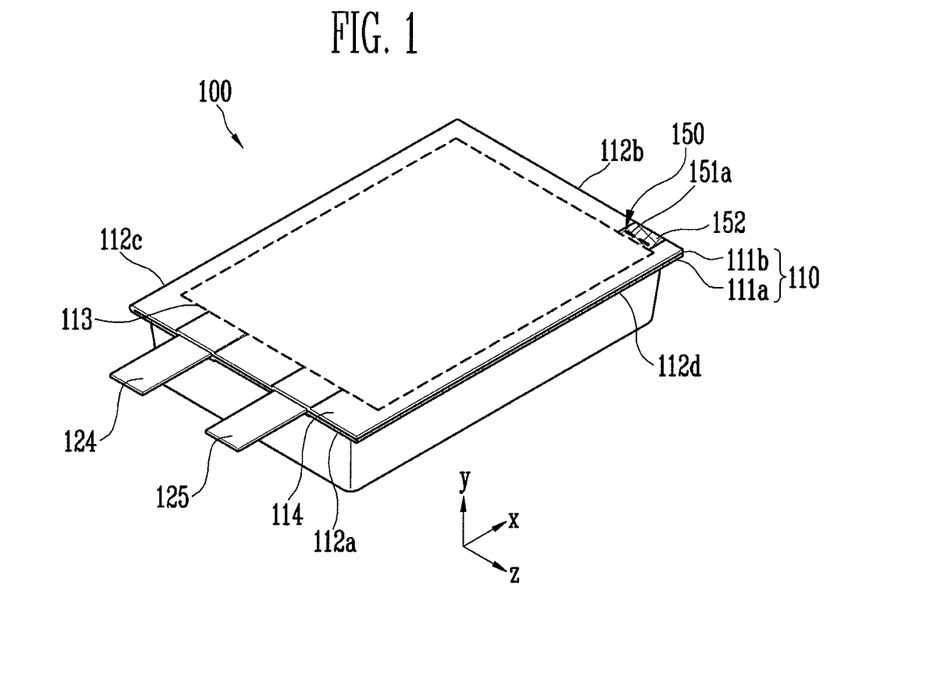
FIG. 1 is a perspective view illustrating major portions of a secondary battery according to an embodiment of the present invention.

FIG. 1 is a perspective view illustrating major portions of a secondary battery according to an embodiment of the present invention.

Referring to FIG. 1, the secondary battery 100 includes a pouch type outer casing 110; an electrode assembly and an electrolyte, accommodated in the outer casing 110; and a sealing portion 150 sealed at least twice at one side of the outer casing 110.

The sealing portion 150 is formed so that only a portion of a gas passage is primarily sealed to be fractured under a predetermined internal pressure of the outer casing 110. After the aging process of the secondary battery, the primarily sealed portion is fractured under a predetermined internal pressure of the secondary battery so that internal gas is exhausted. Then, after the internal gas is exhausted, the sealing portion 150 is secondarily sealed to close the gas passage. Therefore, the sealing portion 150 has a primary sealing portion 151a and a secondary sealing portion 152. Here, the primary sealing portion 151a is formed by fracturing the sealing portion 150 closing the gas passage after the primary sealing, and the secondary sealing portion 152 is formed to close the gas passage opened by the fracture of the primary sealing portion 151a.

According to this embodiment, in the manufacturing process of the secondary battery 100, a gas room for collecting primary internal gas is removed, and the gas passage connected to the gas room is primarily sealed, so that gas generated after the formation charge/discharge for the aging process can be easily exhausted.

The outer casing 110 includes a first outer casing 111a for forming a lower casing and a second outer casing 111b for forming an upper casing. The first outer casing 111a and/or the second outer casing 111b may have a space for accommodating the electrode assembly. In this embodiment, a space 115 is formed only at the first outer casing 111a.

The first and second outer casings 111a and 111b may be integrally formed by thermally joining four surfaces 112a, 112b, 112c and 112d, i.e., upper, lower, left and right surfaces, or three surfaces except for one of the four surfaces. The outer casing 110 has joint portions 114 that are portions at which the first and second outer casings 111a and 111b are thermally joined together.

Figure 2:
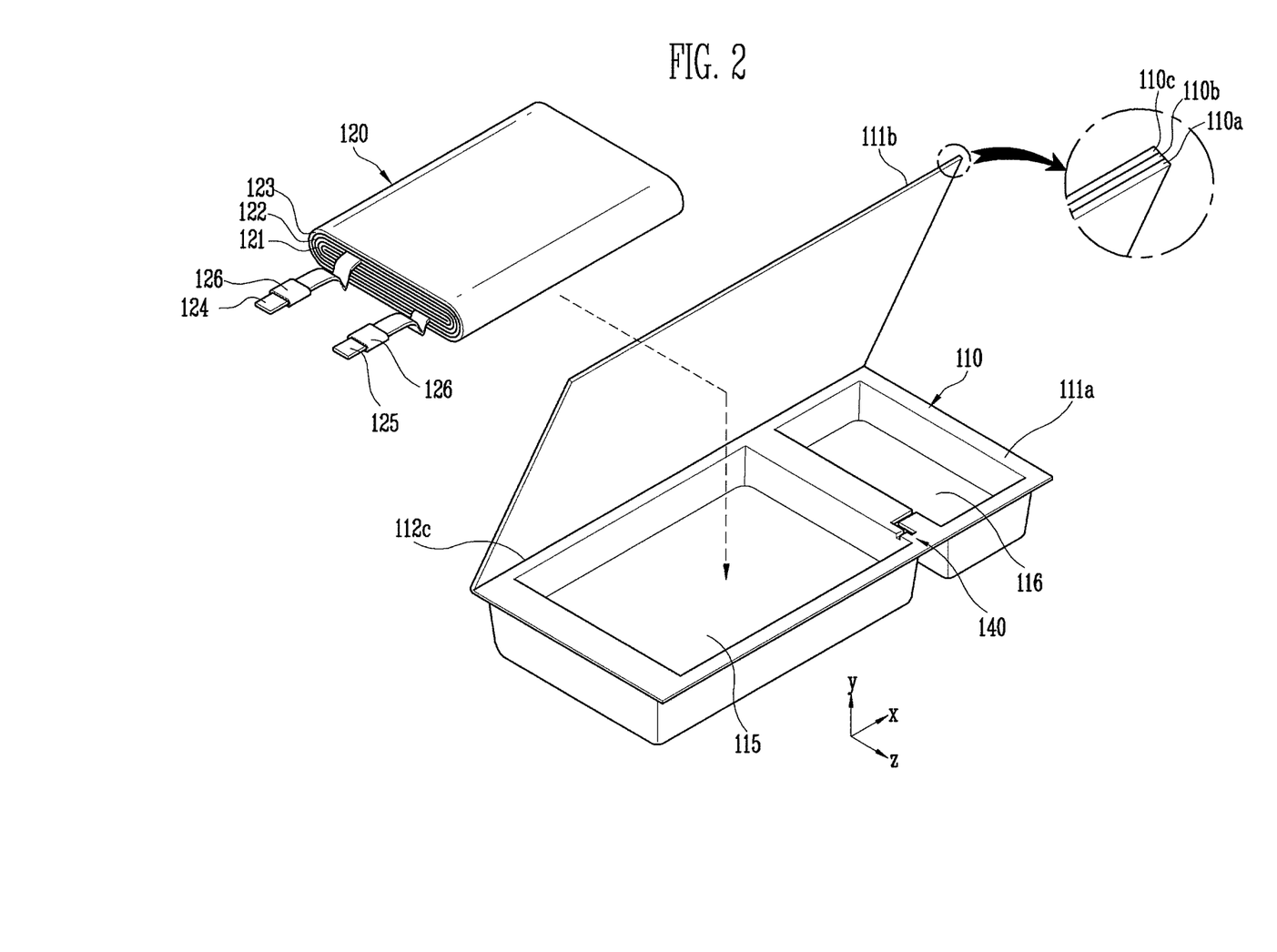
FIG. 2 is a schematic exploded perspective view of a bare cell of the secondary battery according to the embodiment of the present invention.

In this embodiment, as illustrated in FIG. 2, the outer casing 110 has a first surface 112a from which electrode tabs 124 and 125 are extracted; a second surface 112b at which the sealing portion is positioned while being opposite to the first surface 112a; a folded surface 112c for connecting the first and second surfaces 112a and 112b to each other; and a third surface 112d opposite to the folded surface 112c. The folded surface 112c refers to a surface bent so that the first and second outer casing 111a and 111b are connected to each other. The first to third surfaces and the folded surface may correspond to the joint portions 114 of the corresponding surfaces having a predetermined width.

As illustrated in FIG. 2, the outer casing 110 may have a first layer 110a that is an inner layer, a second layer 110b that is a middle layer, and a third layer 110c that is an external protection layer. Here, the first layer 110a has a thermal adhesive property to serve as a sealing material, and the second layer 110b blocks the infiltration of moisture and oxygen as a material for maintaining mechanical strength. The first layer 110a may be formed of a polyethylene-based, polypropylene-based or polyolefin-based resin layer. The second layer 110b may be formed of a metal layer such as aluminum or aluminum alloy. The third layer 110c may be formed of a polyester-based material, a nylon film or the like.

The outer casing 110 is primarily formed by a pouch forming apparatus as the first and second outer casings 111a and 111b that are not joined with each other. The electrode assembly and the electrolyte are accommodated in the outer casing 110, the outer casing 110 is then sealed by folding the first and second outer casings 111a and 111b to face each other and thermally joining edge portions of the first and second outer casings 111a and 111b, which come in contact with each other. In the aforementioned case, except the sealing portion 150, the joint portions may be formed at the first surface 112a, the second surface 112b and the folded surface 112c, positioned around a space 113 of the outer casing 110, and the third surface 112d opposite to the folded surface 112c. Meanwhile, the joint portion 114 formed by the thermal joint may be omitted at the folded surface 112c.

The gas passage in the sealing portion 150 is not joined but opened, and only a portion of the gas passage is primarily sealed after the exhaustion of a primary gas. After the secondary battery passes through a formation charge/discharge process, the portion of the gas passage is secondarily sealed to be completely closed after an internal gas is secondarily exhausted by the fracture of the primarily sealed portion. For example, primary sealing is performed by thermally joining a part of the portion of the outer casing 110 corresponding to the gas passage, which is not thermally joined, and secondary sealing is performed by thermally joining the other parts, thereby implementing the primary and secondary sealing of the gas passage. In addition to the implementation method, sealing may be performed by inserting a separate sealing member into the gas passage and thermally joining the gas passage.

The electrode assembly 120 accommodated in the outer casing 110 may be formed by sequentially stacking a positive electrode plate 121, a separator 122 and a negative electrode plate 123 or by winding the positive electrode plate 121, the separator 122 and the negative electrode plate 123, which are sequentially stacked. In this embodiment, the electrode assembly 120 is a winding type electrode assembly. One ends of each of the two electrode tabs 124 and 125 are attached to the positive and negative electrode plates 121 and 123, respectively. The other ends of the two electrode tabs 124 and 125 are extracted to the exterior of the outer casing 110 through the first surface 112a of the outer casing 110.

The positive electrode plate 121 has a sheet-shaped positive electrode collector and a positive electrode active material coated on the positive electrode collector. The negative electrode plate 123 has a sheet-shaped negative electrode collector and a negative electrode active material coated on the negative electrode collector. The separator 122 is positioned between the positive and negative electrode plates 121 and 123. The separator 122 is provided to prevent an electrical short circuit between the positive and negative electrode plates 121 and 123 and to allow lithium ions to be moved between positive and negative electrode plates 121 and 123.

The positive electrode active material may include a transition metal oxide containing lithium, representative of metal oxides such as $LiCoO_2$, $LiNiO_2$, $LiMnO_2$, $LiMn_2O_4$ and $LiNi_{1-x-y}Co_xM_yO_2$ ($0 \leq x \leq 1$, $0 \leq y \leq 1$, $0 \leq x+y \leq 1$, and M is a metal such as Al, Sr, Mg or La), or a lithium chalcogenide compound. The negative electrode active material may be a carbon material such as crystalline carbon, amorphous carbon, carbon composite or carbon fiber, a lithium metal or a lithium alloy.

The positive and negative electrode collectors may be formed of any one selected from the group consisting of stainless steel, nickel, copper, aluminum and alloy thereof. In order to maximize efficiency, the positive electrode collector may be formed of aluminum or aluminum alloy, and the negative electrode collector may be formed of copper or copper alloy. The separator 122 may be formed of a polymer film such as polyethylene (PE), polypropylene (PP) or polyolefin, or a multi-layered film thereof.

The electrode assembly 120 has a positive electrode tab 124 connected to the positive electrode plate 121 and a negative electrode tab 125 connected to the negative electrode plate 123. An insulator 126 is provided at one end portion of each of the positive and negative electrode tabs 124 and 125. The insulators are used for electrical insulation when the positive and negative electrode tabs 124 and 125 are held between the first and second outer casings 111a and 111b.

In the secondary battery 100 of this embodiment, a gel-type electrolyte may be used as the electrolyte accommodated in the outer casing 110. For example, the gel-type electrolyte is a system consisting of polymer, organic solvent and salt. The gel-type electrolyte may be formed by permeating organic electrolyte in solid polymer. The gel-type electrolyte may be coated on a polyolefin-base porous film to have a predetermined thickness. Polyethylene particles having a low melting point (e.g., a melting point of about 100° C.) may be scattered in the gel-type electrolyte.

Hereinafter, a manufacturing method of the secondary battery according to this embodiment will be described in detail. FIGS. 2 to 9 are views illustrating main processes in a manufacturing method of a secondary battery according to an embodiment of the present invention. FIG. 2

Referring to FIG. 2, a pouch type outer casing 110 is first prepared. The outer casing 110 is formed in a predetermined shape by a pouch forming apparatus, thereby preparing a first outer casing 111a and a second outer casing 111b. The first and second outer casings 111a and 111b is integrally formed by a folded surface 112c. The first outer casing 111a has a first space 115 and a second space 116. The first outer casing 111a has a gas passage forming portion 140 positioned between the first and second spaces 115 and 116. The gas passage forming portion 140 corresponds to a gas passage 140 which will be described later.

Subsequently, an electrode assembly 120 is inserted into the first space 115 so that positive and negative electrode tabs 124 and 125 are extracted to the exterior of the outer casing 110. In one embodiment, an organic electrolyte is inserted together with the electrode assembly 120 into the first space 115.

Figure 3:
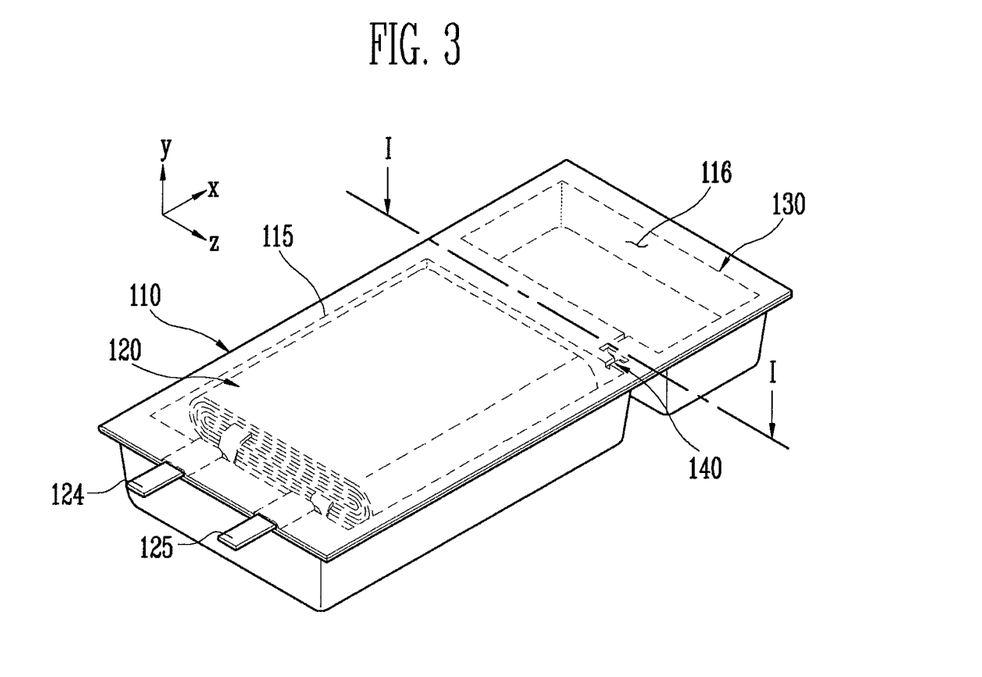
FIG. 3 is a schematic perspective view of the bare cell in a thermally sealed outer case of FIG. 2.

Subsequently, as illustrated in FIG. 3, an edge of the outer casing 110 is thermally joined by the pouch forming apparatus, thereby forming a bare cell. A gas room 130 is provided at one side of the bare cell (primary bare cell). Here, the bare cell refers to a battery device that is not prepared yet to operate as a battery but prepared to operate as the battery through a subsequent process such as an aging process after the exhaustion of a primary internal gas.

Meanwhile, when the bare cell provided with the gas room 130 is formed, air inserted into the first space 115 is gathered to an upper portion of the battery in the gravitational direction while the electrode assembly 120 and the organic electrolyte (not shown) are inserted into the first space 115. The air is moved to the gas room 130 through the gas passage 140. In this case, if the gas room 130 is positioned at the upper portion of the bare cell in the gravitational direction, so that the air in the first space 115 can be easily moved to the gas room 130.

Figure 4:
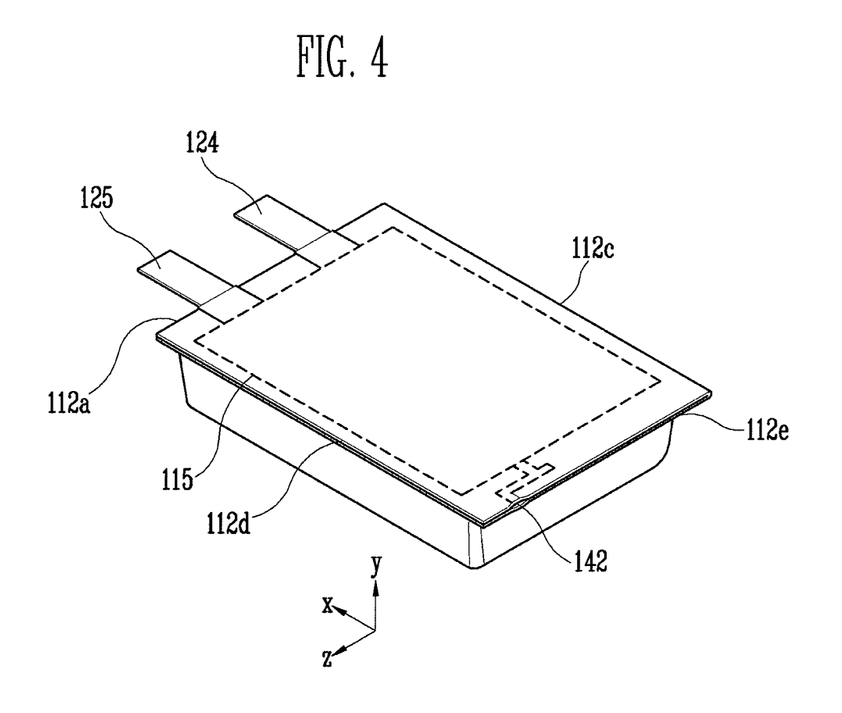
FIG. 4 is a perspective view illustrating the state that a gas room is removed from the bare cell of FIG. 3.

Subsequently, if the volume of the gas room 130 is expanded to some degree or a predetermined time elapses, the gas room 130 is cut away from the bare cell along line I-I. As illustrated in FIG. 4, the bare cell (secondary bare cell) having the gas room 130 cut away therefrom is connected to the gas passage 140 in the state that an inlet portion 141 (see FIG. 5) and an outlet portion 142 of the gas passage 140 are opened.

Figure 5:
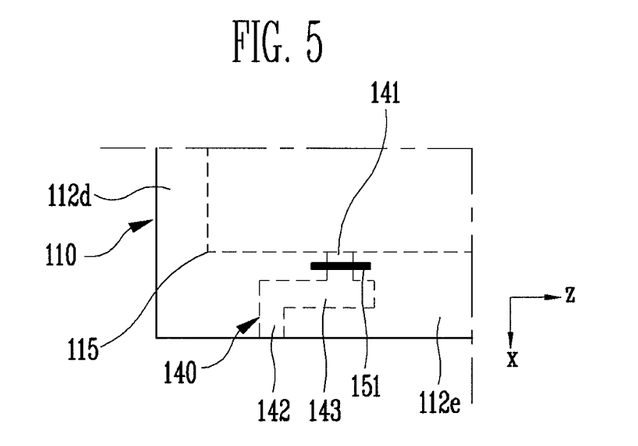
FIG. 5 is a partially enlarged plan view illustrating a primary sealing portion formed at a portion of a gas passage of the bare cell of FIG. 4.

Subsequently, only a portion of the gas passage 140 positioned at a second surface 112e of the outer casing 110 is primarily sealed as illustrated in FIG. 5. A primary sealing portion 151 may be formed on the second surface 112e by the primary sealing. The primary sealing portion 151 may be positioned adjacent to the inlet portion 141 of the gas passage 140. The primary sealing portion 151 is formed only at the portion of the gas passage 140 so as to be properly fractured under a predetermined internal pressure of the outer casing 110. The predetermined internal pressure corresponds to the internal pressure when a predetermined amount of secondary gas is generated in the bare cell after the aging process (see FIG. 6) for the bare cell.

The gas passage 140 has an inlet portion 141 (hereinafter, referred to as one end portion) linked with the first space 115, an outlet portion 142 (hereinafter, referred to as the other end portion) linked with the second space 116 (see FIG. 3), and a path portion 143 positioned between the one end portion 141 and the other end portion 142. In this embodiment, the one end portion 141 and the other end portion 142 are not positioned together on a straight line (a line extending in a direction parallel with the x-direction). That is, the one end portion 141 and the other end portion 142 are connected to each other so that a fluid can be flowed through the path portion 143 which is longer than the straight path for connecting the one end portion 141 and the other end portion 142 to each other.

In one embodiment, the path portion 143 may be formed as an extended space or extended path portion 143. When the extended path portion 143 is used, a primary external sealing portion (not shown) may be formed at the other end portion 142 together with the primary sealing portion 151 formed at the one end portion 141. That is, the extended path portion 143 may be operated as a secondary gas room. The secondary gas exhausted from the interior of the bare cell by the fracture of the primary sealing portion 151 may be collected in the extended path portion 143. The secondary gas collected in the extended path portion 143 may be removed together when a portion 112f (see FIG. 9) of the second surface 112e of the outer casing 110 is cut away and removed.

Figure 6:
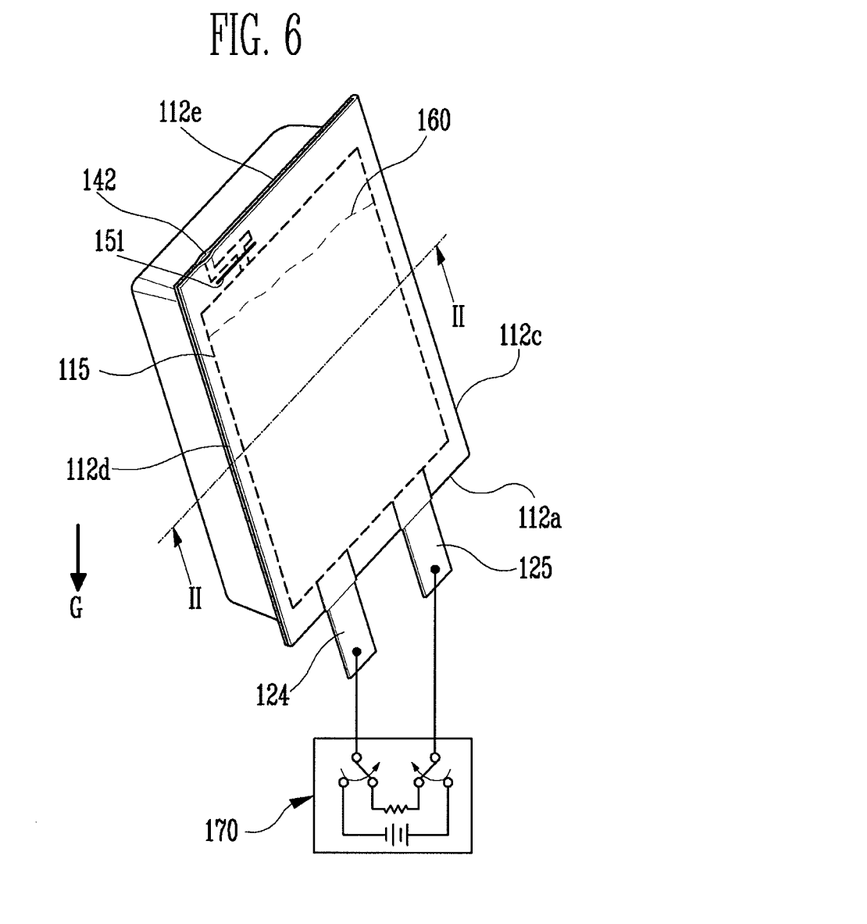
FIG. 6 is a schematic perspective view illustrating a process of aging the primarily sealed bare cell.

Subsequently, as illustrated in FIG. 6, an aging process is performed with respect to the bare cell having the primary sealing portion 151. The aging process includes a formation charge/discharge process for charging/discharging the bare cell using an aging apparatus 170 connected to the electrode tabs 124 and 125 of the bare cell. The bare cell is prepared to operate as a battery through the aging process.

For example, in the first space 115, an organic electrolyte is permeated into the electrode assembly 120, and accordingly, a separator interposed between positive and negative electrode plates is converted into a gel-type polymer electrolyte. At this time, the still remaining air is gathered to the upper portion in the gravitational direction in the first space 115.

In this embodiment, the bare cell is disposed so that the other end portion 142 of the gas passage 140 faces the upper portion, i.e., the direction approximately opposite to the gravitational direction G at least during or after the formation charge/discharge process. As such, the bare cell is disposed to prevent the organic electrolyte from being leaked to the exterior and to facilitate the exhaustion of the secondary internal gas (air) after the formation charge/discharge process. This is because the organic electrolyte still remains in the first space 115 of the bare cell.

Figure 7:
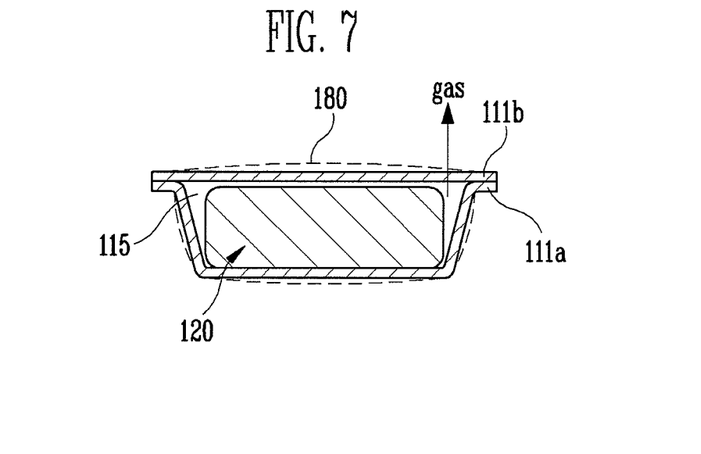
FIG. 7 is a sectional view taken along line II-II of FIG. 6, illustrating a secondary gas discharge of the bare cell.

If gas (air) is re-produced in the first space 115 after the formation charge/discharge process, the bare cell is expanded to some degree as shown with a dotted line 180 in the section of FIG. 7 (corresponding to the section taken along line II-II of FIG. 6). Then, the primary sealing portion 151 of the bare cell is fractured under a predetermined internal pressure of the bare cell. At this time, the gas in the first space 115 is secondarily exhausted through the gas passage 140. For example, the aforementioned secondary gas under the predetermined internal pressure is formed by the air coming from the interior or surface of the electrode assembly to the exterior of the electrode assembly and the temperature or internal pressure increased by the formation charge/discharge process.

Figure 8:
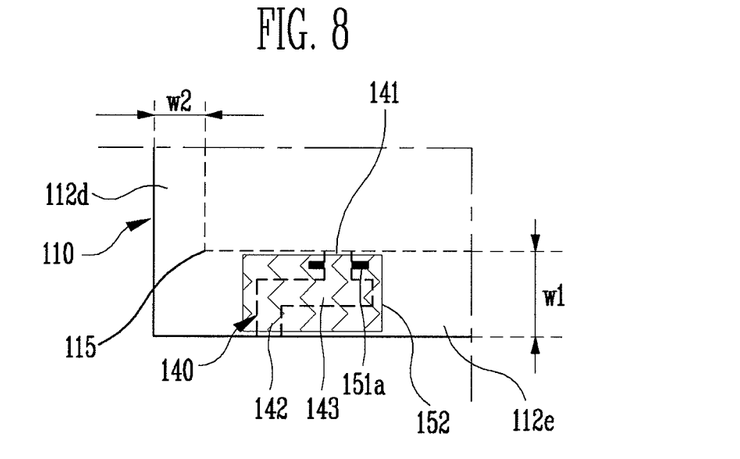
FIG. 8 is a partially enlarged plan view illustrating a secondary sealing portion formed at the gas passage of the bare cell, through which the secondary gas discharge is performed.

Subsequently, as illustrated in FIG. 8, if the gas in the bare cell is secondarily exhausted through the gas passage 140 formed by fracturing the primary sealing portion 151, the gas passage 140 positioned at the second surface 112e of the outer casing 110 is secondarily sealed. A secondary sealing portion 152 is formed at the second surface 112e by the secondary sealing. The secondary sealing portion 152 is basically formed to close the gas passage 140. The secondary sealing portion 152 may be formed to cover a remaining portion 151a of the primary sealing portion 151.

Figure 9:
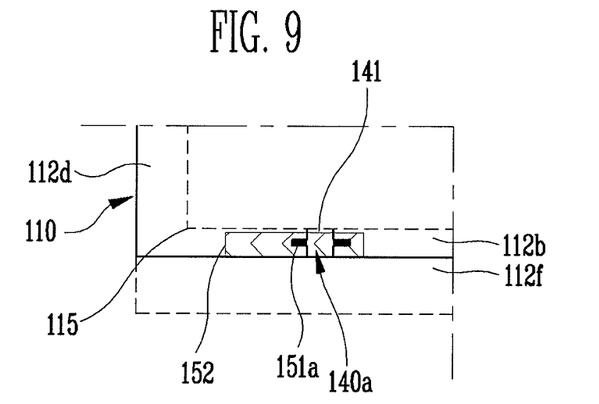
FIG. 9 is a partially enlarged plan view illustrating an embodiment in which a portion of one surface of the outer case in the bare cell of FIG. 8 is cut away.

Meanwhile, in one embodiment, the thickness w1 of the second surface 112e of the outer casing 110 is thicker than the thickness w2 of the third surface 112d of the outer casing 110. This is because the gas passage 140 and the sealing portion 150 are formed at the second surface 112e. However, as illustrated in FIG. 9, the portion 112f of the second surface 112e may be cut away and removed to decrease the thickness of the second surface 112e. The second surface 112e having the remove portion 112f may be formed to satisfy a desired battery size. The secondary battery 100 illustrated in FIG. 1 may be manufactured through the aforementioned manufacturing process.

In this embodiment, the aforementioned bare cell corresponds to a main body of the secondary battery. A protection circuit board, a cover frame and the like may be provided to the exterior of the bare cell. Here, the protection circuit board controls the operation of the bare cell after the aforementioned process and protects the bare cell from overcharge/overdischarge, overcurrent and the like. The cover frame accommodates the bare cell and the protection circuit board.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery housing dimensioned to receive an electrode assembly having a positive plate, a negative electrode plate, a separator interposed therebetween and positive and negative electrode tabs having one ends respectively connected to the positive and negative electrode plates, the housing comprising:
    an electrode assembly having a positive electrode plate, a negative electrode plate, a separator interposed therebetween, and positive and negative electrode tabs having one ends respectively connected to the positive and negative electrode plates; and
    an outer casing having an interior space that is dimensioned to accommodate the electrode assembly so that the other ends of the positive and negative electrode tabs are extracted from a first side to the exterior thereof, the outer casing having a gas passage at a second side,
    wherein the gas passage comprises:
    an inlet portion that is coupled to the interior space of the outer casing via a primary sealing portion wherein the inlet portion extends in a first direction towards the outer perimeter of the outer casing;
    an outlet portion that is coupled to a space exterior of the outer casing via a secondary sealing portion wherein the outlet portion extends in a first direction towards the outer perimeter of the outer casing;
    a path portion between the inlet portion and the outlet portion wherein the path portion has a first and a second end and extends in a second direction that intersects the first direction and is parallel to the outer perimeter of the outer casing and wherein the inlet portion intersects the path portion adjacent a first end of the path portion and wherein the outlet portion intersects the path portion adjacent a second end of the path portion and the inlet, outlet and path portions are arranged so that a path defined by the path portion from the interior space of outer casing to the exterior space of the outer casing must include the path portion; wherein the inlet portion and the outlet portion are dimensioned so as to receive
    the primary sealing portion formed by sealing a portion of the gas passage; and
    the secondary sealing portion formed by sealing the entire gas passage.

2. The secondary battery housing according to claim 1, wherein the primary sealing portion is formed to be fractured under a predetermined internal pressure of the outer casing.

3. The secondary battery housing according to claim 1, wherein the inlet and outlet portions are not positioned on a straight line.

4. The secondary battery housing according to claim 1, wherein the path portion is formed to extend along the second side of the outer casing between the inlet and outlet portions.

5. The secondary battery housing according to claim 1, wherein the first and second sides are formed to face each other.

6. The secondary battery housing according to claim 5, wherein the outer casing has a folded side formed at any one of two sides for connecting the first and second sides to each other.

7. The secondary battery housing according to claim 6, wherein the width of the second side at which the gas passage is formed is wider than that of the third side facing the folded side.

8. The secondary battery housing according to claim 1, wherein the outer casing is formed into a multi-layered film having a first layer that is a heat adhesive layer and second and third layers sequentially stacked on the first layer.

9. The secondary battery housing according to claim 8, wherein the second layer is formed of aluminum or aluminum alloy.

10. The secondary battery housing according to claim 8, wherein the first layer is formed of at least one of polyethylene-based, polypropylene-based and polyolefin-based resins.

11. The secondary battery housing according to claim 8, wherein the third layer is formed of a polyester or nylon film.

12. The secondary battery housing according to claim 1, further comprising an electrolyte accommodated in the outer casing,
wherein the electrolyte includes a polymer electrolyte.

13. A manufacturing method of a secondary battery, the secondary battery comprising the secondary battery housing according to claim 1, the method comprising:
removing a gas room from an outer casing, the outer casing having the gas room connected to an interior of the outer casing in which an electrode assembly is accommodated through a gas passage to collect gas generated in the interior of the outer casing;
primarily sealing a portion of the gas passage in the outer casing having the gas room removed therefrom;
aging the outer casing in which the portion of the gas passage is primarily sealed; and
secondarily sealing the entire gas passage after the gas generated in the interior of the outer casing is exhausted by fracturing the primarily sealed gas passage under a predetermined internal pressure of the outer casing.

14. The manufacturing method according to claim 13, wherein, in the primarily sealing, only the portion of the gas passage is sealed so that the gas passage is fractured under the predetermined internal pressure.

15. The manufacturing method according to claim 13, wherein one and the other ends of the gas passage are connected to each other through a path portion extended longer than a straight line path for connecting the one end and the other end to each other.

16. The manufacturing method according to claim 13, wherein the gas passage has a path portion extended between the one and the other ends thereof.

17. The manufacturing method according to claim 16, wherein the primary sealing portion is positioned at a portion adjacent to the inside of the outer casing.

18. The manufacturing method according to claim 13, further comprising forming an electrode assembly having a positive electrode plate, a negative electrode plate, a separator interposed therebetween, and positive and negative electrode tabs having one ends respectively connected to the positive and negative electrode plates; and an outer casing for accommodating the electrode assembly so that the other ends of the positive and negative electrode tabs are extracted from a first side to the exterior thereof, the outer casing having a gas passage at a second side.

19. The manufacturing method according to claim 18, wherein the primary sealing portion is positioned at a second side opposite to a first side of the outer casing, from which the positive and negative electrode tabs are extracted.

20. The manufacturing method according to claim 19, wherein the outer casing has a folded side formed at any one of two sides for connecting the first and second sides to each other.

21. The manufacturing method according to claim 20, wherein the width of the second side is wider than that of the third side facing the folded side.

22. The manufacturing method according to claim 21, further comprising removing a portion of the second side so that the width of the second side is decreased before or after the secondary sealing.

23. The manufacturing method according to claim 18, further comprising injecting an electrolyte into a portion in which the electrode assembly is accommodated before the formation of the outer casing.

24. The manufacturing method according to claim 13, further comprising positioning the primary sealing portion to face a direction opposite to the gravitational direction.

* * * * *